Patented Dec. 20, 1927.

1,653,314

UNITED STATES PATENT OFFICE.

ROBERT SCHULOFF, OF AUSSIG-ON-THE-ELBE, CZECHOSLOVAKIA, ASSIGNOR TO I. G. FARBENINDUSTRIE AKTIENGESELLSCHAFT, OF FRANKFORT-ON-THE-MAIN, GERMANY, A CORPORATION OF GERMANY.

BODIES OF DESENSITIZING ACTION AND PROCESS OF MAKING SAME.

No Drawing. Application filed December 10, 1926, Serial No. 154,033, and in Germany December 11, 1925.

In German Patent No. 396,402 is described a process for preparing bodies having a desensitizing action upon silver bromide emulsions and upon photographic plates covered with such emulsions. The said bodies are obtained by condensing a methylpyridine or methylquinoline base with an aldehyde of a negative character. These bodies have hitherto not satisfied all the requirements of photographic practice, because they were not sufficiently soluble and did not possess a sufficiently high desensitizing power.

Now I have found that by the combined action of quite determined groups and by placing these groups at determined positions in the molecule complex desensitizing agents are obtained which not only possess sufficient solubility for practical purposes, but also a desensitizing power which satisfies very high requirements. Bodies of this kind can be produced by condensing the alkylsulfates of a p-alkyloxyquinaldine with m-nitrobenzaldehyde. The principal characteristic of these bodies is, that they contain, besides a nitro group situated in the benzene nucleus, an oxyalkyl group in the quinoline complex in para position and as salt-forming agent alkyl sulfuric acid. The fact that the bodies in question are not only soluble in a sufficient degree but possess at the same time a sufficiently high desensitizing power is particularly remarkable as thus they fulfill the said two indispensable conditions for their practical use. Furthermore, the other desensitizing agents which were hitherto generally used, are dyestuffs in a proper sense or bodies of a pronounced dyestuff-character, whereas the products obtainable by my process are no proper dyestuffs, but show only a faint yellow color, and, as their solution as used in practice is almost colorless, the utilization of the compounds above referred to compared with the hitherto used dyestuff solutions, involves a considerable advance in the art of desensitizing photographic plates and particularly color-plates.

The following example serves to illustrate my invention but it is not intended to limit it thereto:

2,348 parts of p-ethoxyquinaldine-methyl-sulfate and 1,132 parts of m-nitrobenzaldehyde are dissolved in 3 parts of alcohol and after having added to this solution 0.75 parts of glacial acetic acid and 0.225 parts of copellidine, the whole is boiled for some hours on the reflux condenser. The product which, on cooling, crystallizes with a yellowish color, becomes immediately pure on being washed with acetone. It is sufficiently readily soluble in water and possesses a remarkable desensitizing power.

I claim:

1. The process for preparing bodies of desensitizing action, which consists in condensing an alkylsulfate of a p-alkyloxyquinaldine with m-nitrobenzaldehyde.

2. The process for preparing bodies of desensitizing action, which consists in condensing the methylsulfate of a p-alkyloxyquinaldine with m-nitrobenzaldehyde.

3. The process for preparing bodies of desensitizing action which consists in condensing an alkylsulfate of a p-ethyloxyquinaldine with meta-nitrobenzaldehyde.

4. The process for preparing bodies of desensitizing action, which consists in condensing the methylsulfate of para-ethyloxyquinaldine with m-nitrobenzaldehyde.

5. As new products, bodies of desensitizing action having the following composition:

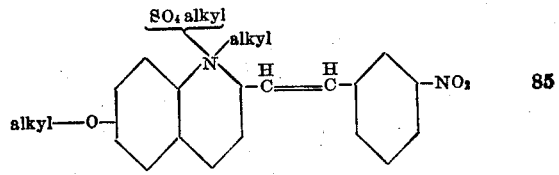

6. As new products, bodies of desensitizing action having the following composition:

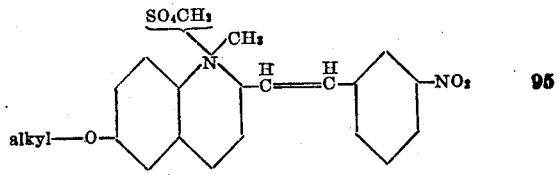

7. As a new product, a body of desensitizing action having the following composition:
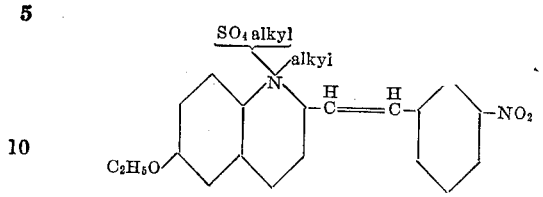
8. As a new product, a body of desensitizing action having the following formula:
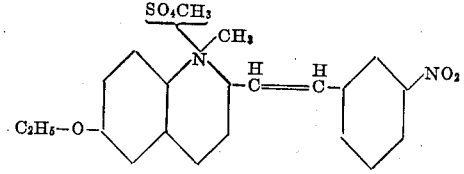
In testimony whereof, I affix my signature.
ROBERT SCHULOFF.